United States Patent [19]
Voshell et al.

[11] Patent Number: 5,832,419
[45] Date of Patent: Nov. 3, 1998

[54] APPARATUS AND METHOD FOR IDENTIFYING AN INTEGRATED DEVICE

[75] Inventors: Thomas W. Voshell, Boise; Lisa J. Davis, Meridian, both of Id.

[73] Assignee: Micron Technology, Inc., Boise, Id.

[21] Appl. No.: 771,436

[22] Filed: Dec. 20, 1996

Related U.S. Application Data

[63] Continuation of Ser. No. 582,581, Jan. 3, 1996, Pat. No. 5,742,526.

[51] Int. Cl.⁶ ...................................................... G06F 13/00
[52] U.S. Cl. ........................ 702/122; 702/108; 364/708.1; 324/73.1; 324/764; 395/183.03; 395/183.16; 371/22.1
[58] Field of Search ..................................... 364/579, 550, 364/481, 708.1, 709.01, 709.09, 709.1, 468.22, 468.23, 468.28; 324/73.1, 158.1, 764, 765; 365/96, 201, 174, 225.7; 340/572, 568, 825.34, 825.54, 537; 235/441, 380, 487, 438, 375, 376; 902/26, 39; 206/710–712, 706; 439/55, 62; 209/571–573, 552; 371/21.1, 22.1; 395/183.03, 183.16, 186, 188.01; 702/122, 108

[56] References Cited

U.S. PATENT DOCUMENTS

| | | | |
|---|---|---|---|
| 4,380,070 | 4/1983 | Steiner | 340/537 |
| 4,523,297 | 6/1985 | Ugon et al. | 235/380 |
| 5,079,725 | 1/1992 | Geer et al. | 364/550 |
| 5,289,113 | 2/1994 | Meaney et al. | 324/73.1 |
| 5,301,143 | 4/1994 | Ohri et al. | 365/96 |
| 5,345,110 | 9/1994 | Renfro et al. | 307/272.3 |
| 5,465,850 | 11/1995 | Kase | 209/573 |
| 5,467,304 | 11/1995 | Uchida et al. | 365/174 |
| 5,532,466 | 7/1996 | Konno et al. | 235/441 |
| 5,627,478 | 5/1997 | Habersetzer et al. | 324/765 |
| 5,642,307 | 6/1997 | Jernigan | 365/96 |

*Primary Examiner*—Emanuel Todd Voeltz
*Assistant Examiner*—Hal D. Wachsman
*Attorney, Agent, or Firm*—Seed and Berry LLP

[57] ABSTRACT

An apparatus identifies an integrated circuit. The apparatus includes a portable housing that has mounted thereto a processing circuit for reading identification data stored in the integrated circuit. A communication device is mounted to the housing and couples the identification data from the integrated circuit to the processing circuit. A display device that is mounted to the housing and is coupled to the processing circuit displays the identification data.

17 Claims, 6 Drawing Sheets

APPARATUS AND METHOD FOR IDENTIFYING AN INTEGRATED DEVICE

CROSS-REFERENCE TO RELATED APPLICATION

This application is a continuation of allowed U.S. patent application Ser. No. 08/582,581, filed Jan. 3, 1996, now U.S. Pat. No. 5,742,526.

TECHNICAL FIELD

The invention relates generally to electronic devices and more specifically to a portable device for reading identification information from an integrated circuit (IC).

BACKGROUND OF THE INVENTION

Many semiconductor devices, i.e., ICs or "chips," have identification data or information stored therein. For example, an IC may have stored therein the revision number of the mask set used to form it. Typically, this information is electronically stored in the IC before it is delivered to the customer, or is written on an exposed surface of the IC die before it is packaged. For example, one may blow in a predetermined pattern a set of fuses formed on the IC to encode such information electronically, or one may use a laser to write such information on an exposed surface of the unpackaged IC. Circuits suitable for use with the fuse-encoding technique are discussed in U.S. Pat. Nos. 5,345,110, entitled "Low Power Fuse Detect and Latch Circuit," which issued to Renfro et al. on Sep. 6, 1994, and 5,301,143, entitled "Method for Identifying a Semiconductor Die Using an IC with Programmable Links," which issued to Ohri et al., on Apr. 5, 1994. Both of these patents are incorporated by reference herein.

If the identification information is electronically stored in the IC, one typically uses a semiconductor testing apparatus to read this information. If the identification information is written on the die, one often must irreparably dismantle the IC package in order to access this information.

A problem associated with using a semiconductor testing apparatus to read identification information from an IC is that one often has limited or no access to such a tester. Because such a tester is often expensive and immobile once installed, it is typically located only at a semiconductor fabrication or test site. Furthermore, because such a tester often requires complex and lengthy reprogramming to perform a task other than the currently programmed task, reprogramming the tester merely to read identification data from an IC is often inefficient. Additionally, because such a tester is often difficult to use, it typically requires a trained technician to operate it.

SUMMARY OF THE INVENTION

In accordance with one aspect of the present invention, an apparatus is provided for identifying an integrated circuit. The apparatus includes a portable housing having mounted thereto a processing circuit for reading identification data stored in the integrated circuit. A communication device is mounted to the housing and couples the identification data from the integrated circuit to the processing circuit. A display device that is mounted to the housing and is coupled to the processing circuit displays the identification data.

An advantage provided by the present invention is a portable, inexpensive, and easy-to-use device for reading identification data from an IC.

DETAILED DESCRIPTION OF THE INVENTION

Figure 1:
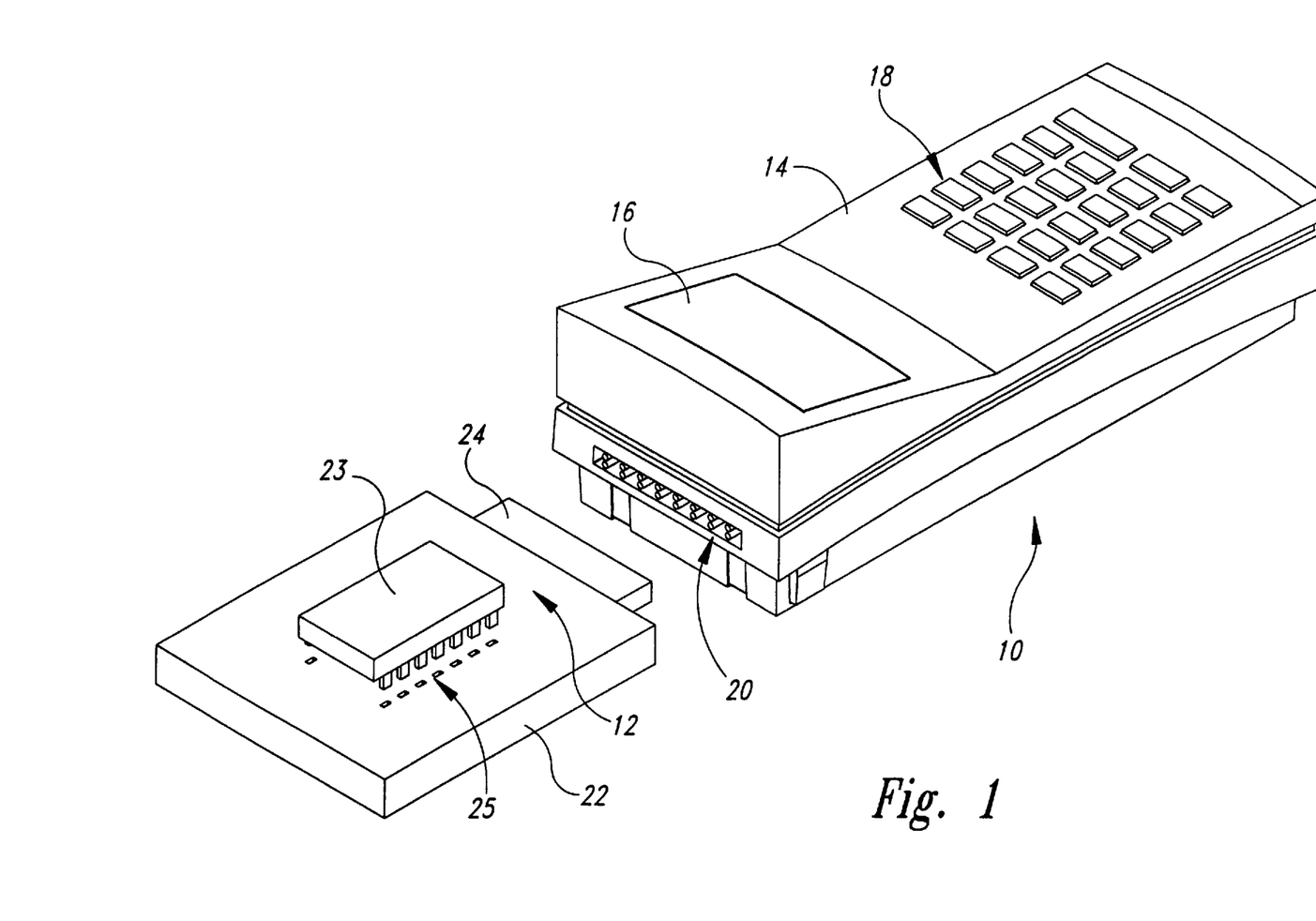
FIG. 1 is an isometric view of a device according to the present invention for reading identification data from an IC.

FIG. 1 is an isometric view of a preferred embodiment of a device 10 for reading identification data that is electronically stored in an IC 12. The device 10 includes a portable enclosure or housing 14, which has a number of sides or walls as shown. In one embodiment of the invention, the size of the housing 14 allows an operator (not shown) to hold the device 10 in his hand. Furthermore, the housing 14 may be made out of any suitable material such as plastic or metal. The device 10 also includes a conventional display 16 that is mounted or otherwise attached to the housing 14 and is exposed through an opening in an upper wall of the housing 14 as shown. In one embodiment of the invention, the display 16 is a Liquid Crystal Display (LCD), although the display 16 may be another type of device such as a Light Emitting Diode (LED) display or a printer. A conventional input device 18 is mounted to the housing 14 and is accessible via another opening or set of openings in the upper wall of the housing 14. In one embodiment of the invention, the input device 18 is a keypad such as that found in a pocket calculator. A conventional communication device, such as a connector 20, is mounted to the housing 14 and extends through an opening in a rear lateral wall thereof.

The device 10 may also include one or more optional adapters 22, which provide an interface between the connector 20 and a package 23 of the IC 12. For example purposes, the IC 12 is shown as having a 14-pin dual in-line package (DIP) 23. The adapter 22 includes a conventional connector 24 that is suitable for mating with the connector 20, and a conventional connector 25, which, for example purposes, is shown as a 14-pin DIP connector that is suitable for mating with the package 23. In one embodiment of the invention, the connector 20 is a conventional male-type connector, and the connector 24 is a conventional female-type connector.

In operation, the IC 12 is coupled to the connector 20 either directly or via the adapter 22. After the device 10 is powered up, typically by the operator switching an on/off switch (not shown in FIG. 1) to the "on" position, processing circuitry mounted within the housing 14 extracts or reads the identification information that has been electronically stored in the IC 12. Such information may include the version of the mask set used to manufacture the IC 12, the date of manufacture, tie position of the die (not shown) of IC 12 on the wafer (not shown), the site of manufacture, or the type of component that IC 12 is. After tie device 10 reads the identification information, it displays the portion or portions of this information that the operator has selected via the input device 18. In one embodiment of the invention, the display 16 displays a menu of prompts that show the operator the portions of information that he can view and explain how he can select the portions he wishes to view. In another embodiment of the invention, the device 10 reads and stores all of the identification information before it gives the operator access to this information. Such reading before giving the operator access allows the operator to uncouple the IC 12 from the device 10 before or while he or she views the identification information on the display 16.

Thus, the device 10 provides a portable, inexpensive and easy-to-use way to read identification data from an IC. The device 10 is useful in a number of situations, from identifying an unmarked IC during trouble shooting of a device to identifying stolen ICs.

Figure 2:
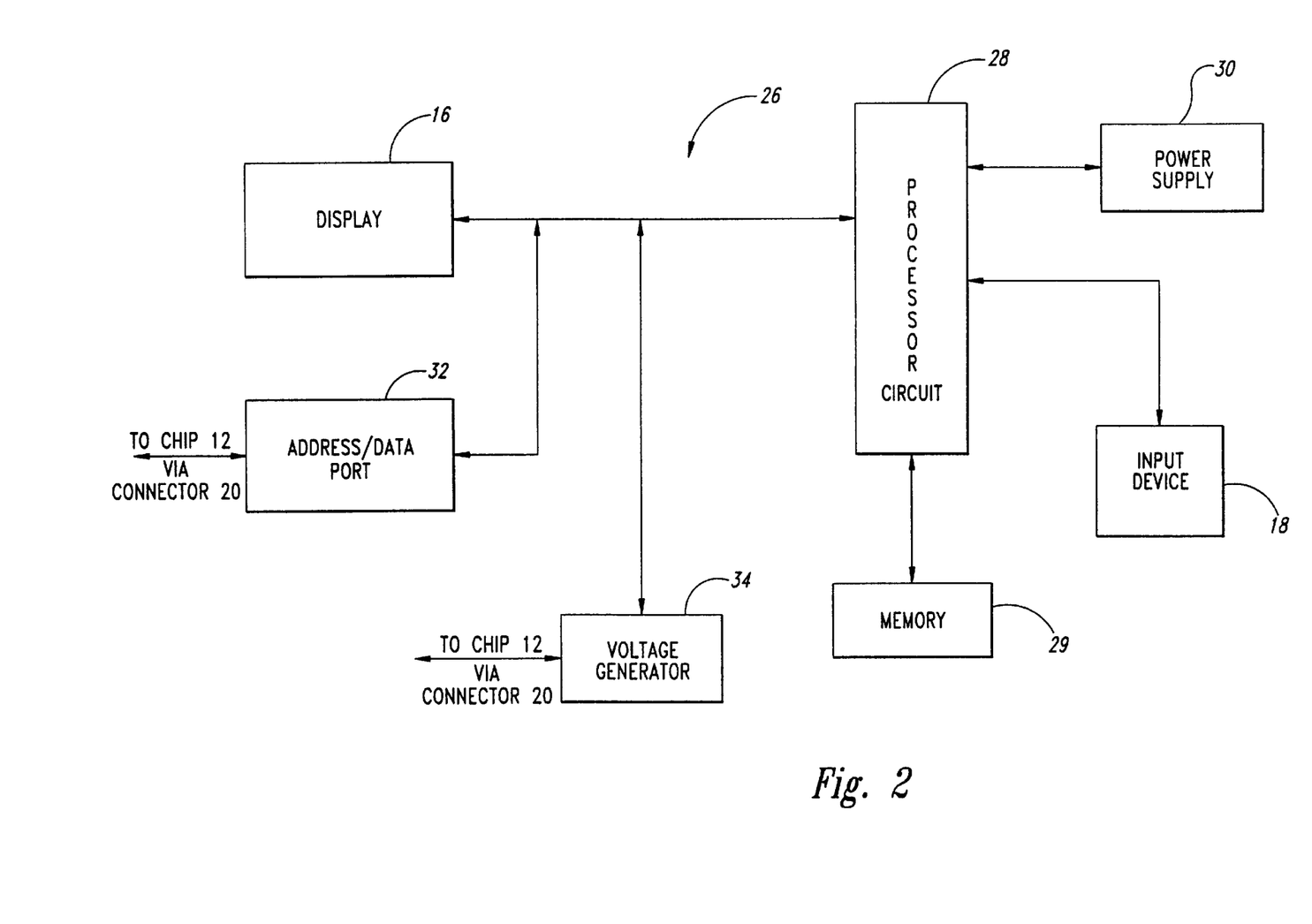
FIG. 2 is a block diagram of the circuitry of the device of FIG. 1.

FIG. 2 is a block diagram of one embodiment of processing circuitry 26 used in the device 10. The circuitry 26 includes a processor circuit 28 that controls other portions of the circuitry 26 as discussed below. A memory 29 stores programming, menu, and other data for the processor circuit 28. The processor circuit 28 executes the programming data, which instructs the processor circuit 28 as to how to manipulate the other data to generate the memory display and information. A power supply 30, which may be a battery, provides power to the processor circuit 28, the memory 29, and the remaining portions of the circuitry 26, and also to the IC 12 via the connector 20 (FIG. 1). The input device 18 allows the operator to provide instructions to the processor circuit 28, and the display 16 displays information that the processor circuit 28 generates and provides to the display 16. For example, in one embodiment of the invention, the processor circuit 28 receives the operator's menu selections from the input device 18, and provides the menu data and the selected identification information for the operator to view on the display 16. An address/data port 32 interfaces the processor circuit 28 to the IC 12 via the connector 20. An optional signal generator 34 provides a signal via the connector 20 that enables the IC 12 to allow the device 10 access to the identification information. That is, the enable signal acts as a combination or key that "unlocks" the identification information from the IC 12. Thus, such an enable signal may be used as a security measure to prevent unauthorized access to the identification information. Or, such an enable signal may be used merely to prevent a user from accidentally stumbling upon such identification information and thus from believing that the IC 12 is malfunctioning.

In operation, when the processing circuit 26 is powered up, the processor circuit 28 executes a start-up routine that is stored in the memory 29. During this start-up routine, the processor circuit 28 tests and initializes to a proper state the other components of the circuitry 26 in a conventional manner. Additionally, the processor circuit 28 may provide data to the display 16 that indicates to the operator that the start-up routine is in progress.

After the processor circuit 28 completes the start-up routine, it addresses the identification-information memory locations (not shown) on the IC 12, and reads and stores in the memory 29 the identification data stored at these locations. First, the processor circuit 28 determines whether or not the IC 12 is properly coupled to the connector 20. (Alternatively, the processor circuit 28 may make this determination during the startup routine.) If the IC 12 is not so coupled, the processor circuit 28 provides a message so stating to the display 16, and waits for the operator to properly couple the IC 12 to the device 10. If the process circuit 28 finds that the IC 12 is properly connected to the device 10, the processor circuit 28 reads and stores the identification data. In one embodiment of the invention, before it begins reading the identification information, the processor circuit 28 instructs the generator 34 to provide the enable signal as described above.

After the processor circuit 28 reads and stores all of the identification data that is stored on the IC 12, it provides the selection menu for display on the display 16. As discussed above, the selection menu shows the operator the categories of identification information that are available, and prompts the operator to select with the input device 18 the category or categories he or she wishes to view. In an embodiment of the invention where the menu has multiple view screens, the operator uses the input device 18 to step through the menu until he or she gets to the screen he or she wishes to view. Of course, other techniques for displaying and selecting the identification information may be implemented without departing from the spirit and scope of the invention.

As discussed above, because the processor circuit 28 reads and stores the identification data before it displays this data on the display 16, the operator can decouple the IC 12 from the device 10 after the processor circuit 28 completes this reading and storing. Thus, the operator may begin and continue to view the identification data even after he or she has uncoupled the IC 12 from the device 10.

Figure 3A:
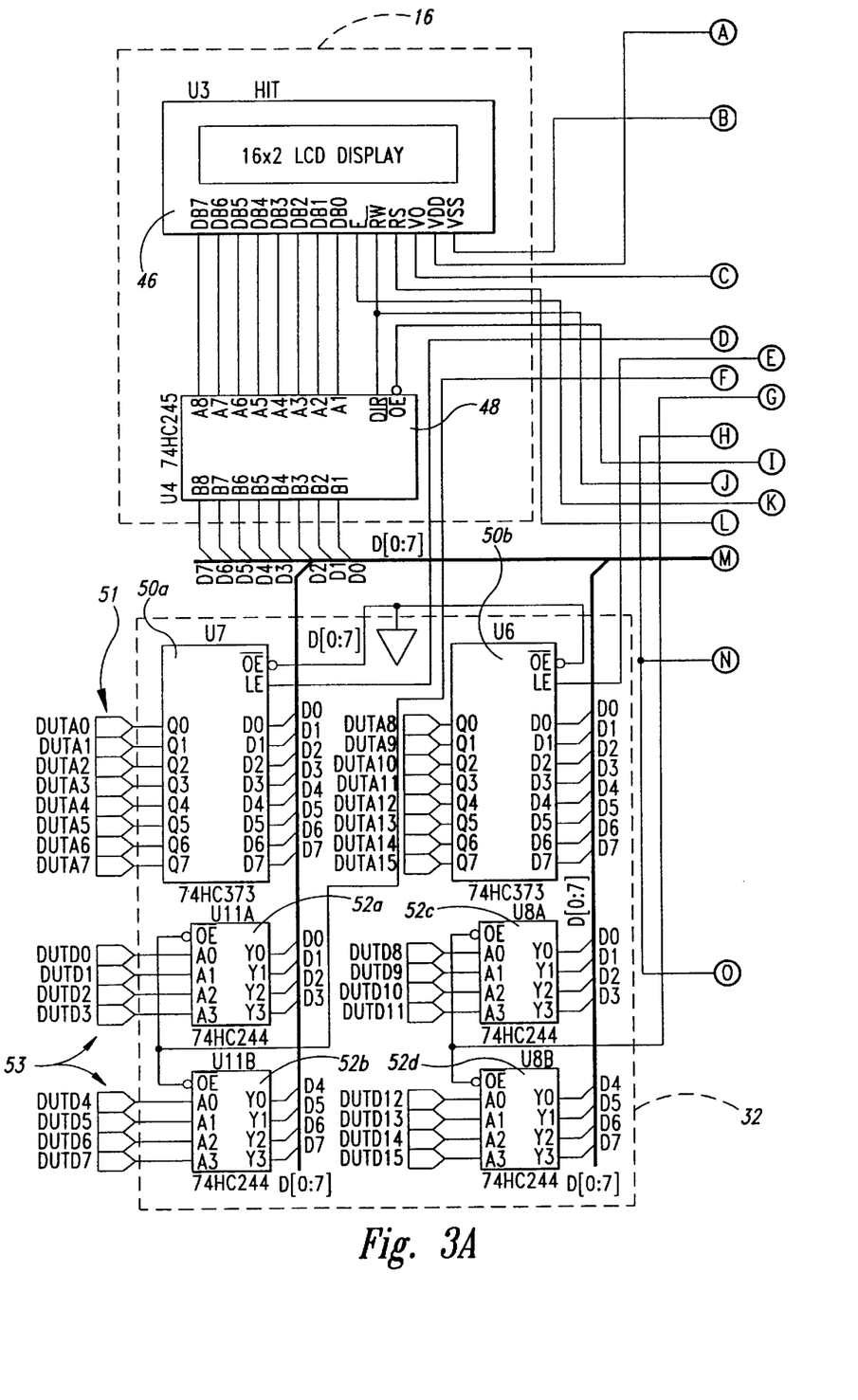
FIGS. 3A and 3B are schematic diagrams of the circuitry of FIG. 2.
Figure 3B:
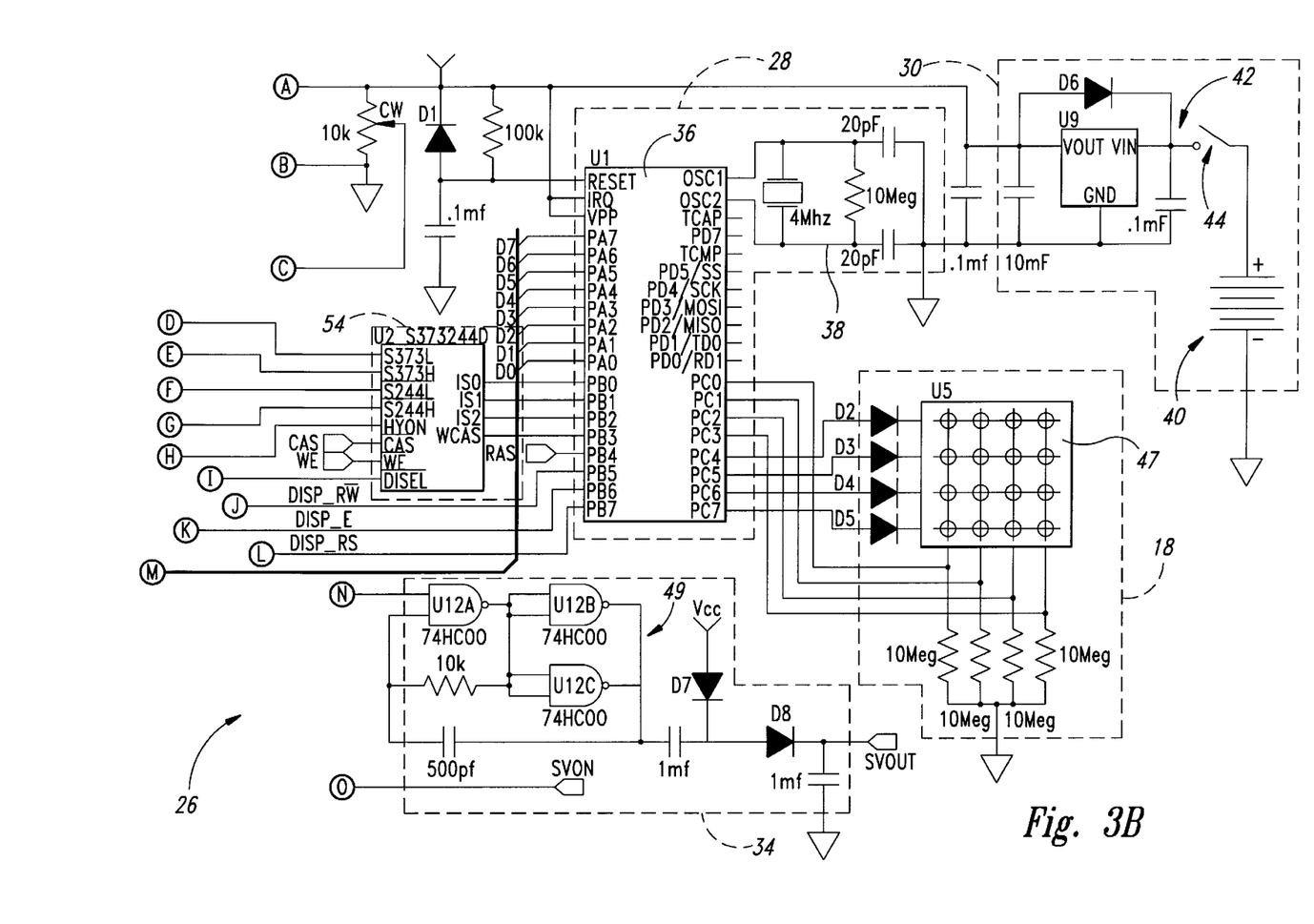

FIGS. 3A and 3B are schematic diagrams of one embodiment of the processing circuit 26 of FIG. 2. Nodes A–O show the interconnection points between the portions of the processing circuit 26 shown in FIG. 3A and the portions shown in FIG. 3B. As shown, the processor circuit 28 includes a processor 36 that has onboard storage memory and a conventional oscillator circuit 38 for generating a stable clock signal. In one embodiment of the invention, the processor 36 is a Motorola 68705 microprocessor, which is coupled as shown. Because the processor 36 has its own onboard storage memory, the memory 29 is part of the processor 36 rather than a separate component.

The power supply 30 includes a battery 40 and a regulator circuit 42, which generates a regulated supply voltage Vcc from the battery voltage. The power supply circuit 30 also includes an on/off switch 44, which is coupled between the battery 40 and the regulator circuit 42. Typically, the power supply provides Vcc to the other components of the circuitry 26 as well as to the IC 12. In one embodiment of the invention, the regulator 42 is a National Semiconductor LM2931, the battery voltage is 9 volts, and Vcc is 5 volts.

The display 16 includes an LCD display panel 46 and a decoder 48. In one embodiment of the invention, the display panel 46 is a Hitachi LM016L, and the decoder 48 is a 74HC245. The input device 18 includes a conventional keypad 47 that is coupled as shown.

The signal generator 34 includes a conventional voltage doubler circuit 49 that substantially doubles the supply voltage Vcc, and supplies this doubled voltage 2Vcc as the enable signal on the terminal SVOUT. This enable signal may be referred to as a "super voltage."

The address/data port 32 includes address latches 50 that are coupled between an address bus 51 and I/O ports PA 0–7 of the processor 36, and data buffers 52 that are coupled between a data bus 53 and the same I/O ports PA 0–7 of the processor 36 as shown. The address bus 51 and the data bus 53 are coupled to the IC 12 via the connector 20 (FIG. 1). In one embodiment of the invention, the address latches 50 are 74HC373 latches, and the data buffers 52 are 74HC244 unidirectional buffers.

The processor circuitry 26 also includes an interface 54, which interfaces control signals from the processor 36 to the voltage generator 34, the display 16, and the address/data port 32. In one embodiment of the invention, the interface 54 is a SAL16U8Z programmable array logic (PAL) device.

Figure 4:
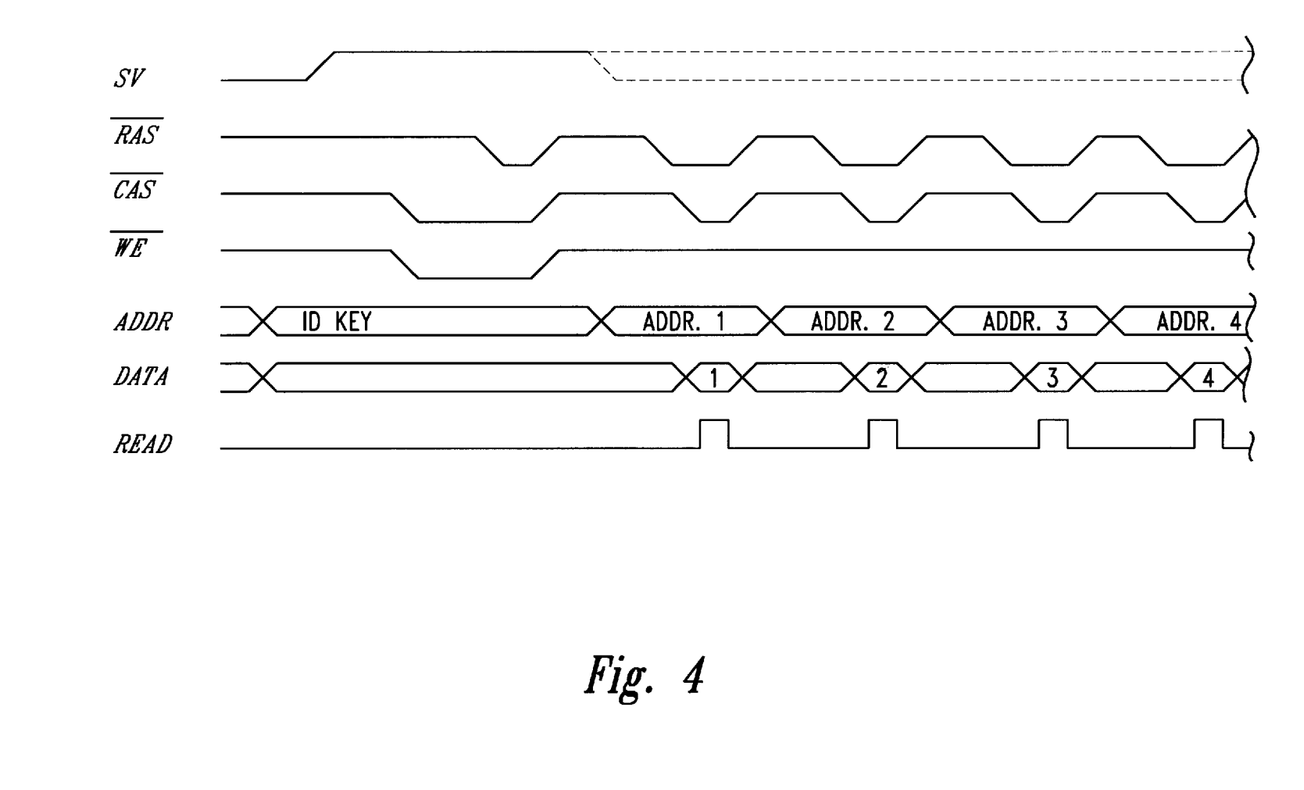
FIG. 4 is a timing chart of signals associated with the circuitry of FIGS. 3A and 3B during the reading of identification data from an IC.

FIG. 4 shows a relative timing diagram of signals that the processor 36 (FIG. 3B) generates and receives during the reading and storing of the identification information from the IC 12 (FIG. 1). To access the identification data, the processor 36 generates a sequence of signals not normally sent to the IC 12 during other modes of operation. In the discussed example, the IC 12 is a dynamic random access memory (DRAM), although it is understood that the processor 36 may implement the same technique to access identification information from other types of ICs.

More specifically, the processor 36 first instructs the voltage generator 34 to generate the super voltage (SV) for a predetermined time that is sufficient to "unlock" the IC 12, and thus allow the device 10 (FIG. 1) access to the identification information stored thereon. The processor 36 also generates an identification code or key on the address bus 51. This code informs the IC 12 that the following read cycles will be of the memory locations (not shown) that store the identification information, and may also provide an additional security feature to prevent unauthorized access to the identification information. While the processor 36 drives this code onto the address bus 51, it also drives both the column address strobe ($\overline{CAS}$) and the write enable ($\overline{WE}$) to an active low logic level. At a predetermined time later, the processor 36 also drives the row address strobe ($\overline{RAS}$) to an active low logic level. Because in its other modes of operation the IC 12 sees $\overline{RAS}$ transition logic low only before $\overline{CAS}$ transitions logic low, not after, this particular sequence of $\overline{RAS}$ and $\overline{CAS}$ is suitable to initiate a read of the identification data. One type of IC 12 that can be unlocked with the described technique is a MT4LC4M4B1BW 16-megabit DRAM, which was manufactured by Micron Semiconductor, Inc. of Boise, Id.

After it instructs the IC 12 to allow the reading of its identification information, the processor 36 begins accessing and storing this information. First, the processor 36 drives $\overline{RAS}$, $\overline{CAS}$, and $\overline{WE}$ to inactive logic high levels. Next, the processor drives an address, here ADDRESS 1, onto the address bus 51, drives $\overline{RAS}$ to a low logic level, and then drives $\overline{CAS}$ to a low logic level. While $\overline{CAS}$ is at a low logic level, the IC 12 places onto the data bus 53 the identification information stored in the addressed location. While the information is present on the data bus 53, the processor 36 pulses an internal signal READ to latch the information into the internal memory of the processor 36. This read sequence continues until the processor 36 reads all of the identification data from the IC 12. The circuitry 26 then displays on the display 16 selected portions of the identification information as discussed above.

Figure 5:
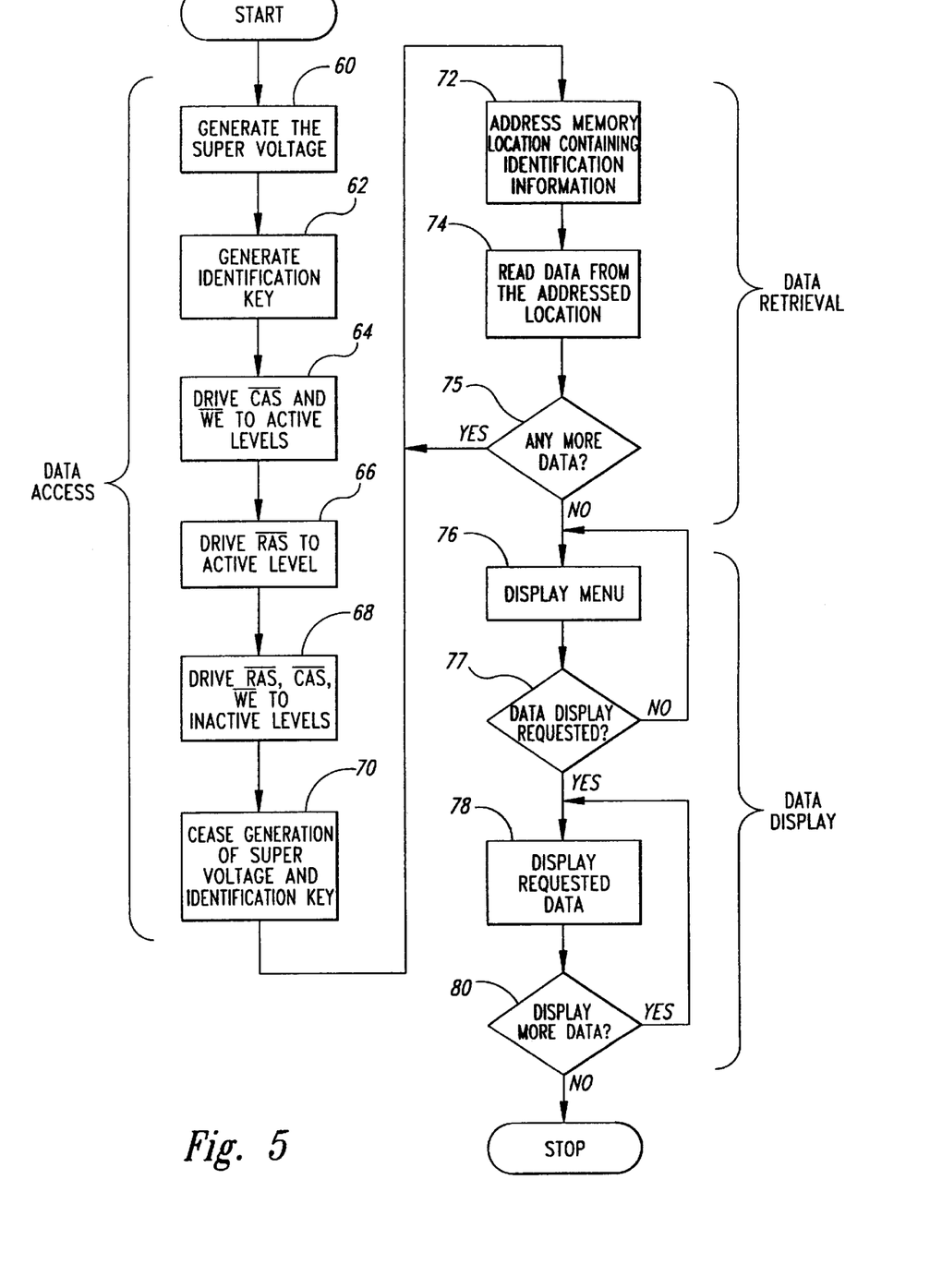
FIG. 5 is a flow chart of the operation of the circuit of FIGS. 3A and 3B.

FIG. 5 is a flow chart detailing the operation as discussed above for the processing circuit 26 of FIGS. 3A and 3B. Blocks 60–70 illustrate the steps required to access the identification data on the IC 12. First, the processor 36 generates the supervoltage as shown in the block 60. Next, while it is generating the supervoltage, the processor 36 generates the identification key on the address bus 51 as shown in the block 62. Next, while it is generating the supervoltage and the identification key, the processor 36 drives the signals $\overline{CAS}$ and $\overline{WE}$ to active logic levels as shown in the block 64. Next, while the processor 36 is generating the supervoltage, the identification key and driving $\overline{CAS}$ and $\overline{WE}$ to active levels, the processor 36 drives $\overline{RAS}$ to an active level as shown in the block 66. Next, as shown in the block 68, the processor 36 drives $\overline{RAS}$, $\overline{CAS}$ and $\overline{WE}$ to inactive levels. As shown in the block 70, the processor circuit 36 then ceases generation of the supervoltage and the identification key.

Blocks 72–75 describe the data retrieval steps. As shown in the block 72, the processor 36 addresses a memory location containing the identification information or data. Next, as shown in the block 74, the processor circuit 36 reads the data from the addressed location. As shown in the decision block 75, if there is any more data to be read, the processor circuit 36 then goes back to the block 72 and begins addressing the next memory location. If all the data has been read, the processor circuit 36 enters the data display portion of the routine.

The blocks 76–80 describe the data display portion of the routine. As shown in the block 76, the processor circuit 36 instructs the display 16 to display the menu. Next, as shown in the decision block 77, if the operator does not request that any specific data be displayed, the processor circuit 36 continues to generate and the display device 16 continues to display the menu. If the operator does select information for display, the processor circuit 36 provides this information for display on the device 16 as shown in the block 78. Next, as shown in the block 80, if the operator requests the display of more data, then the processor circuit 36 provides this data for display on the device 16. When the operator has completed viewing the data, the routine ends.

From the foregoing, it will be appreciated that, although specific embodiments of the invention have been described herein for purposes of illustration, various modifications may be made without deviating from the spirit and scope of the invention. For example, the device 10 and the IC 12 may include wireless receiver/transmitters so that physical coupling between the IC 12 and the device 10 is not required. Accordingly, the invention is not limited except as by the appended claims.

We claim:

1. An apparatus for identifying an integrated circuit, comprising:

a portable housing;

a processing circuit mounted in said housing and operated under software control to read identification data stored in said integrated circuit;

a communication device mounted in said housing, coupled to said processing circuit, and operated to couple said processing circuit to said integrated circuit; and a display device mounted in said housing and coupled to said processing circuit, said display device operated to receive said identification data from said processing circuit and to display said identification data.

2. The apparatus of claim 1, further comprising an input device mounted in said housing and coupled to said processing circuit, said input device operated to provide to said processing circuit one or more instructions that cause said processing circuit to select which of said identification data read by said processing circuit is displayed by said display device.

3. The apparatus of claim 1 wherein said housing is shaped and sized to be held in a hand of an operator.

4. The apparatus of claim 1, further comprising a key pad mounted in said housing and coupled to said processing circuit, said key pad operated to provide to said processing circuit one or more instructions that cause said processing circuit to select which of said identification data read by said processing circuit is displayed on said display device.

5. The apparatus of claim 1, further comprising a signal generator mounted in said housing and coupled to said processing circuit and to said communication device, said generator operated to generate a signal that enables said integrated circuit to allow said processing circuit to read said identification data, said communication device operated to couple said generator to said integrated circuit.

6. The apparatus of claim 1 wherein said processing circuit is operated to generate an identification-data-select menu on said display device and to allow an operator to select from said menu which of said identification data said display device displays.

7. The apparatus of claim 6, further comprising an input device mounted in said housing and coupled to said processing circuit, said input device operated to receive a menu-selection instruction from said operator and to provide said menu-selection instruction to said processing circuit.

8. A method for reading identification information stored in an integrated circuit, comprising:

coupling said integrated circuit to processing circuitry that is mounted to a portable housing;

extracting said identification information from said integrated circuit with said processing circuitry;

providing said extracted identification information from said processing circuitry to a display that is mounted to said portable housing; and displaying said extracted identification information on said display.

9. The method of claim 8, further comprising selecting with said processing circuitry which portions of said extracted identification information are provided to and displayed on said display.

10. The method of claim 8, further comprising:

generating an enable signal with enable circuitry that is mounted to said housing; and providing said enable signal to said integrated circuit to allow said processing circuitry access to said identification information.

11. The method of claim 8, further comprising:

generating a menu with said processing circuitry;

providing said menu from said processing circuitry to said display;

displaying said menu on said display; and selecting from said menu which portion of said identification information is provided to and displayed on said display.

12. The method of claim 11, wherein said selecting further comprises selecting from said menu with a key pad mounted to said housing.

13. An apparatus for identifying an integrated circuit that is disposed within an integrated-circuit package, the apparatus comprising:

a hand-holdable enclosure;

a processor mounted to the enclosure and operated under software control to read identification information stored in the integrated circuit;

a communication device mounted to the enclosure, coupled to the processor, and operated to be coupled to the integrated-circuit package; and a display mounted to the enclosure and coupled to the processor, the display operated to receive the identification information from the processor and to display the identification information.

14. The apparatus of claim 13, further comprising an adapter operated to interface the communication device with the integrated-circuit package.

15. The apparatus of claim 13, further comprising:

an input device mounted to the enclosure, coupled to the processor, and operated to provide an operator instruction to the processor;

a memory mounted to the enclosure, coupled to the processor, and operated to store software instructions;

the processor operated to execute the software instructions to generate an identification-information-selection menu, to provide the menu to the display, and to provide to the display a portion of the identification information that the processor selects in response to the operator instruction; and the display operated to display the identification-information-selection menu and the selected portion of the identification information.

16. An apparatus for identifying an integrated circuit, the apparatus comprising:

a hand-holdable enclosure;

a processor attached to the enclosure and operated under software control to retrieve identification information from the integrated circuit;

a communication device attached to the enclosure, coupled to the processor, and operated to couple the identification information from the integrated circuit to the processor;

a display attached to the enclosure and coupled to the processor, the display operated to receive the identification information from the processor and to display the identification information; and an adapter operated to couple the communication device to the integrated circuit.

17. The apparatus of claim 16, further comprising:

an input device attached to the enclosure, coupled to the processor, and operated to provide an operator instruction to the processor;

a memory attached to the enclosure, coupled to the processor, and operated to store software instructions;

the processor operated to execute the software instructions to generate an identification-information-selection menu, to provide the menu to the display, and to provide to the display a portion of the identification information that an operator selects from the menu via the input device; and the display operated to display the identification-information-selection menu and the selected portion of the identification information.

* * * * *